3,166,557
PIPERAZINE DERIVATIVES
Sidney D. Ross, Williamstown, and Manuel Finkelstein, North Adams, Mass., assignors to Sprague Electric Company, North Adams, Mass., a corporation of Massachusetts
No Drawing. Filed Oct. 9, 1963, Ser. No. 314,876
4 Claims. (Cl. 260—268)

The present invention relates to new chemical compounds and more particularly to compounds having the following formula:

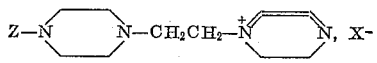

wherein X is a halogen atom and Z is an organic radical selected from the class consisting of an aromatic group having at least one appropriate activating substitutent, a nitrogen atom containing aromatic group and an N-alkyl-substituted nitrogen atom containing aromatic group.

One of the main chemical variables in aromatic nucleophilic substitution (the reaction involved in this invention) is the activation or deactivation provided by the structure of the aromatic compound. A substituent is called activating or deactivating according as it produces, with respect to hydrogen, an increase or decrease in the rate of reaction. In the case of heterocyclic compounds, a hetero atom is said to be activating if introduction of it into a ring in place of CH or CH=CH increases the rate of substitution.

The new compounds of the present invention are prepared by reacting a suitably activated aromatic halogen compound with 1,4-diazabicyclo (2·2·2) octane i.e. with triethylene diamine. The suitably activated aromatic halogen compounds contemplated include the following:

(1) Aryl halides having one or more of the same or from 2 to 5 of the following different, electron-withdrawing, activating substituents:

- Diazonium salt group ($-N_2^+$)
- Nitroso group (NO)
- Nitro group ($NO_2$)
- Methylsulfonyl ($CH_3SO_2$)
- Trimethylammonio (($CH_3$)$_3N^+$)
- Trifluoromethyl ($CF_3$)
- Acyl groups (RCO)
- Cyano (CN)
- Carboxyl (COOH)
- Carboxylate ($COO^-$)
- Ester (COOR)

(2) Nitrogen atom containing aromatic halide compounds and alkyl-substituted nitrogen containing aromatic halide compounds. Examples of these compounds are 4 chloropyridene, 4 chloroquinoline, 4 chloro N-methyl-pyridinium iodide, etc.

It is necessary that the halogen atom be ortho or para to the activating group or the nitrogen atom. This is true even when employing a condensed nuclear compound such as bromo-nitro-naphthalene. The bromo and nitro substituents must occupy the 1 and 2 or 1 and 4 positions. If this rule is not followed practical activation levels will not be reached.

Following are examples of the formation of representative members of the above-identified group of compounds.

EXAMPLE I

*N-p-nitrophenyl-N'-[2-(4-aza-1-azoniabicyclo (2·2·2)-octane)-ethyl] piperazine chloride*

A solution of p-nitrochlorobenzene (0.20 mole) and 1,4 diazabicyclo (2·2·2) octane (0.0576 mole) in benzyl alcohol (400 ml.) was kept in a stoppered flask at 150° C. for 20 hours. The reaction mixture was poured into one liter of benzene and this solution was extracted five times with water. Water was removed from the combined extracts under vacuum, and the dark residue was crystallized from isopropyl alcohol. The total crude product, obtained in three crops, weighed 10.0 g. (91%). It does not melt but decomposes slowly starting at 250° C.

*Analysis.*—Calculated for $C_{18}H_{28}N_5O_2Cl$: Theoretical, Cl 9.29%. Found, Cl 9.09%, 9.17%.

The following structure has been proved for this compound:

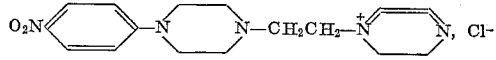

EXAMPLE II

*N-2,4 dinitrophenyl-N'-[2-(4-aza-1-azoniabicyclo-(2·2·2)-octane)-ethyl]-piperazine chloride*

A solution of 2,4-dinitrochlorobenzene (0.03 mole) and 1,4 diazabicyclo (2·2·2) octane (0.07 mole) in acetonitrile (100 ml.) was left standing at room temperature for 48 hours. The product, which precipitated, was filtered; yield, 10.0 g. (78%). A sample crystallized from i-propanol-methanol-hexane did not melt but underwent slow decomposition starting at 236° C.

*Analysis.*—Calculated for $C_{18}H_{27}N_6O_4Cl$: Theoretical, Cl 8.30%. Found, Cl 8.26%.

The following structure has been proved for this compound:

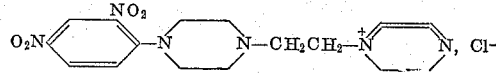

EXAMPLE III

*N-2 nitro-4 trifluoromethylphenyl-N'-[2-(4-aza-1-azoniabicyclo (2·2·2)-octane)-ethyl]-piperazine chloride*

A solution of 2 nitro-4 trifluoromethyl chlorobenzene (0.03 mole) and 1,4 diazabicyclo (2·2·2) octane (0.07 mole) in 100 ml. of acetonitrile was refluxed for 18 hours. The acetonitrile was removed in vacuum to yield a total crude product of 4.0 grams (30%). A sample crystallized from isopropanol did not melt but underwent slow decomposition starting at 212° C.

*Analysis:*—Calculated for $C_{19}H_{27}N_5O_2F_3Cl$: Theoretical, Cl 7.88%. Found, Cl 8.21%.

The following structure has been proved for this compound:

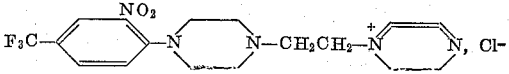

The compounds of the instant invention have utility as the solute in electrolyte systems for use in electrolytic capacitors. The novel feature of the electrolyte system resides in the cationic part of the solute. The compounds as formed have a positive charge in the cation and therefore in an electric field tend to concentrate at the cathode.

By providing a readily reducible group in the cation, hydrogen produced at the cathode is in effect scavenged by its reduction of the reducible group. For electrolyte purposes the halide anions can be replaced by pentaborate, nitrate or any other suitable anion by straightforward metathesis reactions.

What is claimed is:
1. A compound of the formula

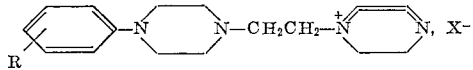

wherein X is selected from the group consisting of halogen, pentaborate and nitrate and R is at least one electron-withdrawing activiating substituent selected from the group consisting of NO, $NO_2$, $CH_3SO_2$, $CF_3$, CN and COOH.

2. A compound having the formula:

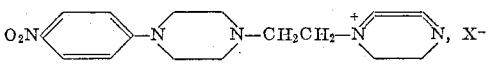

wherein X is a halogen atom.

3. A compound having the formula:

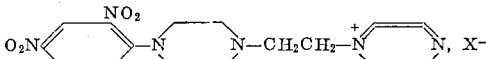

wherein X is a halogen atom.

4. A compound having the formula:

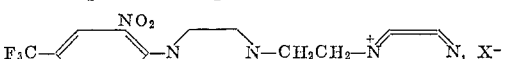

wherein X is a halogen atom.

No references cited.